(12) United States Patent
Koehnke

(10) Patent No.: US 9,981,462 B2
(45) Date of Patent: May 29, 2018

(54) MASTERBATCH CONTAINING DECORATIVE ADDITIVE

(71) Applicant: PolyOne Corporation, Avon Lake, OH (US)

(72) Inventor: Nicholas Koehnke, Dacula, GA (US)

(73) Assignee: PolyOne Corporation, Avon Lake, OH (US)

( * ) Notice: Subject to any disclaimer, the term of this patent is extended or adjusted under 35 U.S.C. 154(b) by 17 days.

(21) Appl. No.: 15/041,629

(22) Filed: Feb. 11, 2016

(65) Prior Publication Data

US 2016/0237271 A1    Aug. 18, 2016

Related U.S. Application Data

(60) Provisional application No. 62/117,742, filed on Feb. 18, 2015.

(51) Int. Cl.
| | | |
|---|---|---|
| *C08K 11/00* | (2006.01) |
| *B33Y 70/00* | (2015.01) |
| *C08L 75/04* | (2006.01) |
| *C08L 53/00* | (2006.01) |
| *B29C 39/00* | (2006.01) |
| *B29C 51/00* | (2006.01) |
| *B33Y 10/00* | (2015.01) |
| *C08J 3/22* | (2006.01) |
| *C08L 53/02* | (2006.01) |
| *B29C 47/00* | (2006.01) |
| *B29K 31/00* | (2006.01) |
| *B29K 21/00* | (2006.01) |

(52) U.S. Cl.
CPC ............ *B33Y 70/00* (2014.12); *B29C 39/003* (2013.01); *B29C 51/002* (2013.01); *B33Y 10/00* (2014.12); *C08J 3/226* (2013.01); *C08K 11/00* (2013.01); *C08L 53/00* (2013.01); *C08L 53/025* (2013.01); *C08L 75/04* (2013.01); *B29C 47/0004* (2013.01); *B29C 47/0009* (2013.01); *B29K 2021/003* (2013.01); *B29K 2031/04* (2013.01); *B29K 2995/0018* (2013.01); *C08J 2300/22* (2013.01); *C08J 2300/26* (2013.01); *C08J 2325/08* (2013.01); *C08J 2353/00* (2013.01); *C08J 2431/04* (2013.01)

(58) Field of Classification Search
None
See application file for complete search history.

(56) References Cited

U.S. PATENT DOCUMENTS

| | | | | |
|---|---|---|---|---|
| 4,594,211 A | * | 6/1986 | Mohnhaupt | B42D 3/02 264/132 |
| 2008/0051491 A1 | * | 2/2008 | Hobbs | B01J 13/14 523/200 |
| 2010/0272936 A1 | * | 10/2010 | White | B32B 27/08 428/35.4 |

FOREIGN PATENT DOCUMENTS

WO    WO2016131197    8/2016

OTHER PUBLICATIONS

Celanese EVA Performance Polymers, "Ateva 1922A Ethylene Vinyl Acetate Copolymer" (2014).
Apex Colors "MegaSpecks" (2014).
PolyOne Corporation "Dynaflex G2711-1000-00 Technical Data Sheet" (2013).
Exxon Mobil "Escorene Ultra LD 723.28 Molding" (2014).

* cited by examiner

*Primary Examiner* — Jeffrey C Mullis
(74) *Attorney, Agent, or Firm* — John H. Hornickel

(57) ABSTRACT

A masterbatch containing one or more colors of decorative particulate additive is disclosed and is particularly suitable for use in thermoplastic elastomer plastic articles.

17 Claims, 1 Drawing Sheet

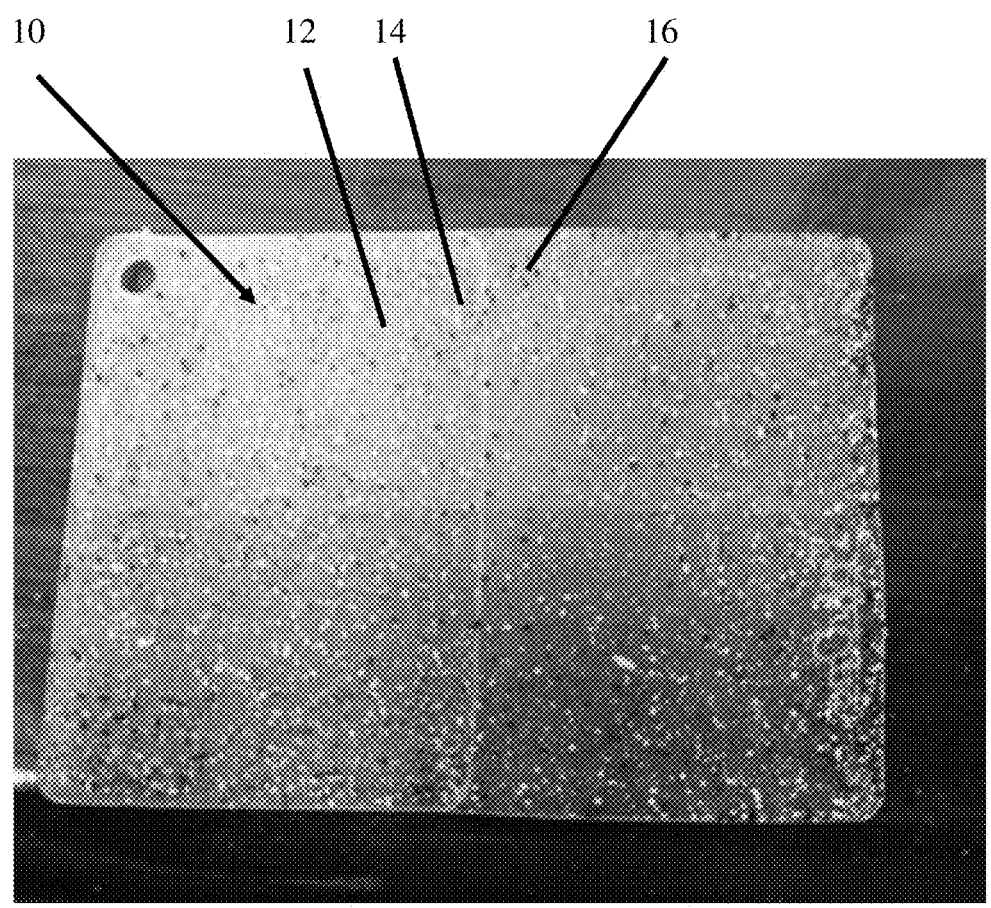

US 9,981,462 B2

MASTERBATCH CONTAINING DECORATIVE ADDITIVE

CLAIM OF PRIORITY

This application claims priority from U.S. Provisional Patent Application Ser. No. 62/117,742 and filed on Feb. 18, 2015, which is incorporated by reference.

FIELD OF THE INVENTION

This invention relates to masterbatches to which special effect particles are added and to methods of making those masterbatches.

BACKGROUND OF THE INVENTION

Plastic has taken the place of other materials in a variety of industries. Plastic has replaced glass to minimize breakage, reduce weight, and reduce energy consumed in manufacturing and transport. In other industries, plastic has replaced metal to minimize corrosion, reduce weight, and provide color-in-bulk products.

A variety of additives, functional and decorative, can be added to plastic compositions by the addition of a masterbatch prior to final shaping of the plastic compounds into plastic articles. Typically, the masterbatch is added to polymer base resin and optionally other ingredients at the entry point for an extrusion or molding machine. Thorough melt-mixing of the masterbatch with and into the resin allows for consistent dispersion of the concentrated additives in the masterbatch into polymer resin for consistent performance properties of the polymer compound in the final plastic article.

Plastic compounds can use either a thermoplastic polymer such as a polyethylene (PE), polyamide (PA), or polyester (PET) or a thermoplastic elastomer (TPE) such as a styrenic bulk copolymer (SBC) or olefin block copolymer (OBC).

SUMMARY OF THE INVENTION

What the art needs is a thermoplastic elastomer compound containing decorative additive(s), preferably providing sparkling decorative effects.

The present invention has found that, unexpectedly, the use of ethylene vinyl acetate (EVA) as a masterbatch carrier can provide excellent dispersion of the masterbatch containing special effects particles into a SBC TPE, even better than a masterbatch carrier of the TPE itself.

One aspect of the invention is a masterbatch, comprising: (a) decorative particulate additive, (b) ethylene vinyl acetate, wherein the decorative particulate additive comprises no more than about 40 weight percent of the masterbatch.

"Decorative particulate additive" means an additive which provides a sparkling appearance in the color(s) of the particulate when illuminated by visible light and which has a mean particle size of less than about 550 micrometers and preferably a mean particle size of less than about 300 micrometers.

Features will become apparent from a description of the embodiments of the invention with reference to the color photograph comprising the drawing.

BRIEF DESCRIPTION OF THE DRAWING

FIG. 1 is a color photograph of a sample of a compound made from masterbatch of the present invention.

EMBODIMENTS OF THE INVENTION

Decorative Particulate Additive

Any particulate meeting the definition of decorative particulate additive above is a candidate for use in the present invention. One commercially available product line meeting such definition is the Megaspecks® product line in a number of colors from Apex Colors of Bensonville, Ill., USA. Apex Colors identify its Megaspecks® products as proprietary products used to prepare granite-effects in plastics and solid surfaces. The particulate is resistant to the shear and heat seen during extrusion, blow molding, and injection molding processes. Preferably, the additive is FDA-compliant with excellent light resistance and chemical stability. The Megaspecks® product line possesses such properties. While the product line is proprietary to Apex Colors, it is known that the Megaspecks® product line does not use metallic particles. It is believed that the Megaspecks® product line uses colored thermoset polymer cut into micrometric mean particle sizes.

While at least one color of decorate particulate additive is used in the masterbatch, use of multiple colored decorative particulate additives is desirable, especially two colors to provide at least different and preferably contrasting colors in the final plastic article. A single masterbatch can deliver all of the colored decorative particulate additives. Alternatively, one can provide multiple masterbatches, each with a single color of decorative particulate additive, for inventory control and efficient mixing and matching of multiple colors in the final plastic article.

Thermoplastic Polymer Carrier Resin

Any thermoplastic resin is a candidate for the carrier resin for the masterbatch because there is a desire for any of these resins to also be the material into which the masterbatch is melt-mixed. It has been found that the resin can be ethylene vinyl acetate (EVA). Other resins can be included as carriers of the decorative particulate additive.

The EVA resin can have a weight average molecular weight ranging from about 3000 to about $3 \times 10^6$, and preferably from about 50,000 to about 500,000.

The resin EVA can have a glass transition temperature ranging from about −100° C. to about 300° C., and preferably from about −50° C. to about 200° C.

The EVA resin is preferably pulverized, and when pulverized, can have a particle size ranging from about 10 to about 10,000 micrometers, and preferably from about 500 to about 5000 micrometers.

An example of a commercially available heat-sensitive thermoplastic resin is Escorene™ Ultra LD 723.28 EVA resin from ExxonMobil. Ateva® 1922A EVA resin from Celanese Corporation was commercially available at the time of experimentation described below. These EVA resins have had a vinyl acetate content of about 18.5-19 percent; a melt flow index of about 22-23 g/10 min. at a load of 2.16 kg and a temperature of 190° C. (ASTM D1238); a peak melting temperature of about 83-85° C.; a Shore A Hardness of 75-85 at 15 seconds (ASTM D2240); a Shore D Hardness of 30-32 at 15 seconds (ASTM D2240); and a Vicat Softening Temperature of 55-56° C. (ASTM D1525). Other properties are identified in the commercial technical literature for such commercially materials.

Table 1 shows acceptable, desirable, and preferable ranges of ingredients useful in the present invention, all expressed in weight percent (wt. %) of the entire compound. The compound can comprise, consist essentially of, or consist of these ingredients. Any number between the ends of the ranges is also contemplated as an end of a range, such that all possible combinations are contemplated within the possibilities of Table 1 as candidate compounds for use in this invention.

TABLE 1

Masterbatch

| Ingredient (Wt. %) | Acceptable Range | Desirable Range | Preferred Range |
|---|---|---|---|
| Ethylene Vinyl Acetate | 30-99 | 40-90 | 55-80 |
| Optional second carrier resin | 0-30 | 0-20 | 0-10 |
| Decorative Particulate Filler(s) | 1-40 | 10-40 | 20-35 |

Making the Masterbatch

The preparation of masterbatches of the present invention is uncomplicated. The masterbatch of the present invention can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

TPE Compounds and Uses of TPE Compounds

Any of the masterbatches loaded with decorative particulate additive (s) described above can be melt-mixed with a thermoplastic elastomer resin.

Candidate TPEs include SBC TPEs and OBC TPEs. Preferably the TPE is highly translucent or approaching transparency. Commercially available GLS™ TPEs from PolyOne Corporation are preferred, such as Dynaflex™ G2711-1000-00 TPE, a mineral oil filled styrene-ethylene/butylene-styrene compound is currently preferably used. Dynaflex™ G2711-1000-00 TPE has excellent colorability with good ozone and UV stability. It has a rubbery feel and a soft touch, as known to those having skill in the thermoplastic elastomer art. It is translucent and known for processability in both extrusion and molding equipment. It has a specific gravity of about 0.88 (+/−0.02) g/cm$^3$ (ASTM D792); a melt mass flow rate of about 4 g/10 cm (+/−2.0) measured at 190° C. and 2.16 kg (ASTM D1238); a tensile elongation at break at 23° C. of 640% (+/−10%) (ASTM D412); a compression set at 23° C. of 14% (+/−2.0%) (ASTM D395B); and a Shore A durometer hardness at 10 sec. of 43 (+/−3.0) (ASTM D2240).

The TPEs can also include a variety of thermoplastic resins, such as polypropylene (PP), polyethylene(PE), polyvinyl chloride (PVC), polycarbonate (PC), acrylonitrile-butadiene-styrene (ABS), polyethylene terephthalate (PET), polybutylene terephthalate (PBT), polyoxymethylene (POM), polyamide (PA), polystyrene (PS), polymethylmethacrylate (PMMA), polyphenylene sulfide (PPS) or polylactic acid (PLA), any copolymer of any of them, any combination thereof.

The compound can also contain one or more conventional plastics additives in an amount that is sufficient to obtain a desired processing or performance property for the thermoplastic compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silanes coupling agents, titanates and zirconates coupling agents; slip and anti-blocking agents; stabilizers; stearates; ultraviolet light absorbers; viscosity regulators; PE waxes; catalyst deactivators, and combinations of them.

The final thermoplastic compound can comprise, consist essentially of, or consist of any one or more of the thermoplastic resins, decorative particulate additive(s), in combination with any one or more optional functional additives. Any number between the ends of the ranges is also contemplated as an end of a range, such that all possible combinations are contemplated within the possibilities of Table 2 as candidate compounds for use in this invention. Ratios of thermoplastic resins to masterbatch can range from about 33:1 to about 50:1 (about 2% of masterbatch addition to about 3% masterbatch addition) depending on desired final loading and usage rate to achieve that final loading of decorative particulate additive.

TABLE 2

Thermoplastic Compound

| Ingredient | Acceptable | Desirable | Preferable |
|---|---|---|---|
| Thermoplastic Elastomer(s) and Masterbatch Carrier Resin(s) | 95.0-99.98% | 96.0-99.8% | 98.2-99.6% |
| Decorative particulate Additive(s) | 0.02-2.0% | 0.2-1.0% | 0.4-0.8% |
| Optional Functional Additive(s) | 0-5 | 0-3 | 0-1 |

Processing

The preparation of finally shaped plastic articles is uncomplicated and can be made in batch or continuous operations.

Extrusion, as a continuous operation, and molding techniques, as a batch operation, are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

The combination of thermoplastic elastomer resin, masterbatch containing decorative particulate additive(s), and optional other functional additives can be made into any extruded, molded, spun, casted, calendered, thermoformed, or 3D-printed article.

Candidate end uses for such finally-shaped thermoplastic articles are listed in summary fashion below.

Appliances: Refrigerators, freezers, washers, dryers, toasters, blenders, vacuum cleaners, coffee makers, and mixers;

Consumer Goods: Power hand tools, rakes, shovels, lawn mowers, shoes, boots, golf clubs, fishing poles, and watercraft;

Electrical/Electronic Devices: Printers, computers, business equipment, LCD projectors, mobile phones, connectors, chip trays, circuit breakers, and plugs;

Healthcare: Wheelchairs, beds, testing equipment, analyzers, labware, ostomy, IV sets, wound care, drug delivery, inhalers, and packaging;

Industrial Products: Containers, bottles, drums, material handling, valves, and safety equipment;

Consumer Packaging: Food and beverage, cosmetic, detergents and cleaners, personal care, pharmaceutical and wellness containers;

Transportation: Automotive aftermarket parts, bumpers, window seals, instrument panels, consoles; and Wire and Cable: Cars and trucks, airplanes, aerospace, construction, military, telecommunication, utility power, alternative energy, and electronics.

FIG. 1 shows the decorative effect possible using a masterbatch described above with TPE resin. The masterbatch contained 16.67 weight percent of 250 micrometer Ultra White MegaSpecks® particulate; 16.67 weight percent of 250 micrometer Ultra Blue MegaSpecks® particulate and 66.66 weight percent of pulverized ATEVA 1922A EVA (from Celanese Corporation and now discontinued commercially) which was made by melt-mixing the carrier EVA resin and the two decorative particulate additives at a temperature of 170-200° C. using a twin screw extruder which formed pellets.

The masterbatch was then melt-mixed at a 2 weight percent rate into Dynaflex™ G2711-1000-00 TPE and molded in a 33 ton Cincinnati Injection Molder at a temperature of 190-220° C. for 25 sec. duration to make the plaque seen in FIG. 1. The plaque had dimensions of 8.5×6.0×0.076/0.152 cm.

It can be seen in FIG. 1 that the plaque 10 has a matrix 12 of translucent TPE with both white sparkling decorative particulate 14 and blue sparkling decorative particulate 16. The overall appearance of the translucent TPE compound is quite pleasing and decorative for use in a variety of plastic articles. When incident visible light strikes the translucent TPE compound, both the translucency and the sparkling reflections of the particulate, in two colors, can be seen by a user of the plastic article. As stated above, one or more colors of particulate can be used in the masterbatch and thence in the TPE compound, so long as the total particulate in the TPE compound is less than about 2.0 weight percent, desirably less than about 1 weight percent, and preferably less than about 0.8 weight percent.

By comparison, when a masterbatch containing 25 weight percent of 250 micrometer Ultra White MegaSpecks® particulate; 25 weight percent of 250 micrometer Ultra Blue MegaSpecks® particulate and 50 weight percent of Dynaflex™ G2711-1000-00 TPE was melt-mixed at a 3 weight percent rate into Dynaflex™ G2711-1000-00 TPE and molded, there were processing difficulties.

The invention is not limited to the above embodiments. The claims follow.

What is claimed is:

1. A masterbatch, comprising:
   (a) decorative particulate additive of colored thermoset polymer cut into particulates,
   (b) ethylene vinyl acetate,
   wherein the decorative particulate additive comprises no more than about 40 weight percent of the masterbatch.

2. The masterbatch of claim 1, wherein the decorative particulate additive is an additive which provides a sparkling appearance in the color(s) of the particulates when illuminated by visible light.

3. The masterbatch of claim 1, wherein the decorative particulate additive is composed of two different colors.

4. A polymer compound, comprising:
   (a) the masterbatch of claim 1; and
   (b) thermoplastic elastomer resin of styrenic block copolymer (SBC) or olefin block copolymer (OBC).

5. The compound of claim 4, wherein the compound further comprises a thermoplastic resin selected from the group consisting of polypropylene (PP), polyethylene (PE), polyvinyl chloride (PVC), polycarbonate (PC), acrylonitrile-butadiene-styrene (ABS), polyethylene terephthalate (PET), polybutylene terephthalate (PBT), polyoxymethylene (POM), polyamide (PA), polystyrene (PS), polymethylmethacrylate (PMMA), polyphenylene sulfide (PPS), polylactic acid (PLA), and any combination thereof.

6. The compound of claim 4, wherein the compound further comprises adhesion promoters; biocides; anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silane coupling agents, titanates and zirconates coupling agents; slip and anti-blocking agents; stabilizers; stearates; ultraviolet light absorbers; viscosity regulators; PE waxes; catalyst deactivators, or combinations of them.

7. The compound of claim 4, wherein the amount of decorative particulate additive ranges from about 0.02 to about 2 weight percent of the compound.

8. A method of making a masterbatch of claim 1, comprising the step of melt-mixing ethylene vinyl acetate and decorative particulate additive to form a masterbatch.

9. The method of claim 8, further comprising step (b) of melt mixing the masterbatch with polymer resin and optionally other ingredients to form a polymer compound in its finally-shaped form.

10. The method of claim 9, wherein step (b) uses a technique for final shaping selected from the group consisting of extrusion, molding, spinning, casting, thermoforming, calendering, spinning, or 3D printing.

11. The masterbatch of claim 2, wherein the decorative particulate additive is composed of two different colors.

12. The compound of claim 4, wherein the decorative particulate additive is an additive which provides a sparkling appearance in the color(s) of the particulates when illuminated by visible light.

13. The compound of claim 12, wherein the compound further comprises a thermoplastic resin selected from the group consisting of polypropylene (PP), polyethylene (PE), polyvinyl chloride (PVC), polycarbonate (PC), acrylonitrile-butadiene-styrene (ABS), polyethylene terephthalate (PET), polybutylene terephthalate (PBT), polyoxymethylene (POM), polyamide (PA), polystyrene (PS), polymethylmethacrylate (PMMA), polyphenylene sulfide (PPS), polylactic acid (PLA), and any combination thereof.

14. The compound of claim 12, wherein the compound further comprises adhesion promoters; biocides; anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silane coupling agents, titanates and zirconates coupling agents; slip and anti-blocking agents; stabilizers; stearates; ultraviolet light absorbers; viscosity regulators; PE waxes; catalyst deactivators, or combinations of them.

15. The compound of claim 12, wherein the amount of decorative particulate additive ranges from about 0.02 to about 2 weight percent of the compound.

16. The method of claim 8, wherein the decorative particulate additive is an additive which provides a sparkling appearance in the color(s) of the particulates when illuminated by visible light.

17. The method of claim 16 wherein the step of melt-mixing is step (a) and the method further comprises a step (b), wherein step (b) uses a technique for final shaping selected from the group consisting of extrusion, molding, spinning, casting, thermoforming, calendering, spinning, or 3D printing.

* * * * *